G. VINCENT.
Car-Truck.
No. 201,309. Patented March 12, 1878.
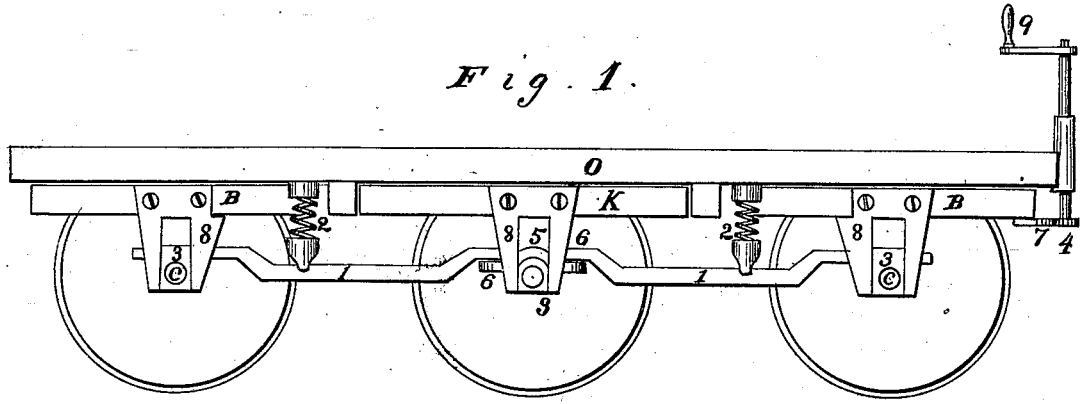
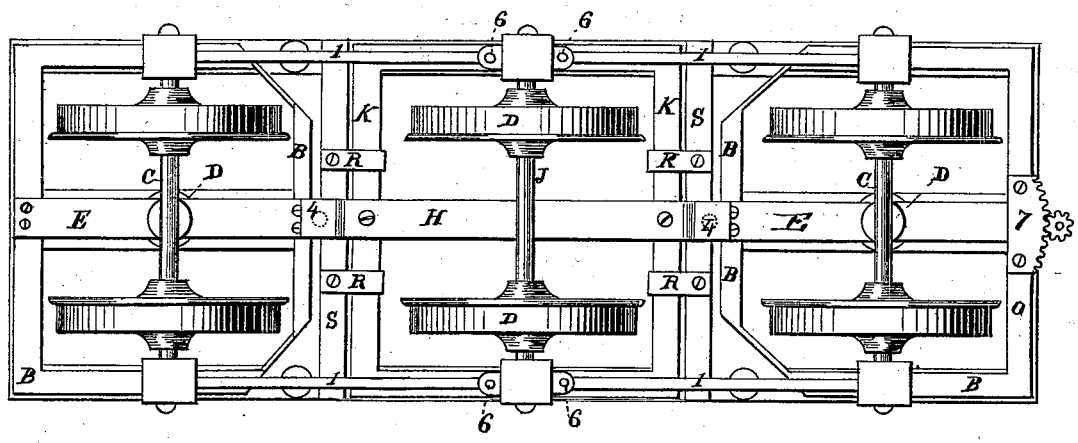

UNITED STATES PATENT OFFICE.

GEORGE VINCENT, OF STOCKTON, CALIFORNIA.

IMPROVEMENT IN CAR-TRUCKS.

Specification forming part of Letters Patent No. 201,309, dated March 12, 1878; application filed November 12, 1877.

*To all whom it may concern:*

Be it known that I, GEORGE VINCENT, of Stockton, San Joaquin county, and in the State of California, have invented certain new and useful Improvements in Car-Trucks; and do hereby declare that the following is a full, clear, and exact description thereof, reference being had to the accompanying drawing, and to the letters of reference marked thereon, making a part of this specification.

My invention relates to improvements in car-trucks having six or more wheels, so constructed that in passing curves the wheels on each side of the truck arrange themselves to conform to the line of the curve, and thus avoid friction and wear; and it consists in the construction and combination of parts, as will be hereinafter more fully set forth.

I construct these trucks with six or more wheels, so arranged that each axle and pair of wheels thereon carry an independent frame, said frames being so connected together and to the main frame that in passing curves the central axle will move endwise, and this movement will cause the other independent frames with their axles to rotate partially in a horizontal plane, and thus keep the axles in a line with the radii of the curve being passed, and the wheels on each side of the truck in a line with the curve.

In the drawing, Figure 1 is a side elevation of my invention, and Fig. 2 a bottom view of the same.

B B represent independent frames carried by the end axles C C of the truck O, and K is an independent frame carried by the middle axle J. R R are straps fastened rigidly to the cross-timbers S, which form a part of the main frame, said straps and timbers serving as guides to keep the middle independent frame K in position, and at the same time allow it to move freely with the middle axle as it moves endwise in passing curves. D D are the pivots for the end frames B B, said pivots passing through the central strips E E, attached to said end frames. H is a center strip for the middle frame K, and the ends of this strip are, by pins L L, connected with the inner ends of the strips E E.

The above devices are substantially the same in construction and operation as described in Letters Patent recently granted to me, and need no further description here.

8 8 represent pedestals attached to the independent frames, and 3 3 are the boxes in which the ends of the axles turn, said boxes working freely up and down in the pedestals.

1 1 represent equalizing-bars, which support and carry the springs 2 2, and these springs support the main frame O. This frame O may be connected to the car-body in any of the known and usual ways.

5 represents an extension of the middle box 3, or an extra piece laid therein, said piece extending forward and backward of said box, to form rests and connections for the inner ends of the equalizing-bars 1, they being connected together by pins 6. The outer ends of the equalizing-bars 1 rest and slide upon the boxes of the end axles; and, if desired, rollers or other devices to avoid friction may be interposed between said boxes and the outer ends of the equalizing-bars.

If the truck is long, a ball-and-socket joint may be constructed at each end of the springs, to allow them to move laterally without moving or bending the springs too much.

By this construction I relieve the independent frame of any portion of the weight of the car-body, which is a great advantage, as it saves the expense and trouble of constructing and keeping in working order several friction-rollers and bearing places. I also obtain the advantages of both equalizing-bars and the independent turning frames B B and K in one combination, which is the principal object of this invention.

The trucks thus constructed are intended to be used upon street-railroads as well as upon other railroads.

In order to facilitate the turning out upon switches and side tracks, I attach to the end of the car-truck, in position to be easily reached, the shaft and crank 9, said shaft having upon its lower end a small gear-wheel, 4, which meshes with a segmental rack, 7, attached to the independent frame B at that end, and thereby guiding the car.

Having thus fully described my invention, what I claim as new, and desire to secure by Letters Patent, is—

In a railroad-truck having a central laterally-movable truck-frame and two pivoted end frames, all connected as described, the equalizing-bars 1 1, pivoted at their inner ends to an extension of the boxes for the center axle, and sliding over the boxes for the end axles, substantially as and for the purposes herein set forth.

In testimony that I claim the foregoing I have hereunto set my hand this 20th day of October, 1877.

GEORGE VINCENT.

Witnesses:
 ED. J. SMITH,
 M. A. WHEATON.